Patented Apr. 4, 1950

2,502,482

UNITED STATES PATENT OFFICE 2,502,482

PREPARATION OF MODIFIED SOY PROTEIN

Louis Sair and Richard Rathman, Decatur, Ind., assignors to Central Soya Company, Inc., Fort Wayne, Ind., a corporation of Indiana No Drawing. Application September 4, 1945,
Serial No. 614,442

5 Claims. (Cl. 99—14)

1

This invention relates to the preparation of modified soy protein, and more particularly to modified glycinin which is particularly adapted for use as a whipping agent for the preparation of nougats, fudge, divinity and cream candies, meringue powders, and for a large number of other food uses.

An object of the invention is to prepare a modified soy protein which has superior whipping qualities and which results in a foam of unusually high stability. A further object is to provide modified soy protein which is miscible in water and will whip in this mixture to a fairly light foam. A further object is to provide a process of controlled modification for the soy protein which results in a product that may be whipped with water, corn syrup, and cane sugar to yield a frappé of good body, unusually high stability, desirable shortness, and substantial freedom from any tendency for the separation of a liquid layer over at least a one-month storage period.

In general, the treatment of the soy protein may be in a series of steps in which the glycinin is isolated from the other soy bean constituents and subjected to controlled modification. The steps may consist of the extraction of the protein in soluble form from soy bean meal, the precipitation of the glycinin from the water-soluble extract at or near the isoelectric pH range of the glycinin, the washing of the precipitated glycinin, the enzymatic modification of the glycinin, and the termination of enzymatic modification by the adjustment of the pH.

In our earlier operations, the enzymatic modification of the glycinin was halted at the desired point by heat treatment which was a useful step and which present certain additional advantages in the process. We have discovered that when the heat treatment is omitted and instead a control of the enzymatic modification accomplished solely by the adjustment of the pH, the frappé produced through the use of the product has considerably greater stability.

The invention is applicable to soy protein in any suitable form. Ordinarily, the soy protein stock will consist of soy bean meal to which the process of the invention is applied. However, the invention is also applicable to soy protein in less or more pure form.

In accordance with the invention, the glycinin of the soy protein, which as isolated from the protein is practically insoluble in water at a pH of 5, is modified to render at least a substantial portion of the glycinin water soluble at a pH of 5. In the process of modification, a portion of the

2 glycinin is also hydrolyzed and is found in the product to contain nitrogen in the non-protein form.

In treating soy bean meal, the desired soy protein is separated from the other constituents of the meal. The first step may consist of extraction of the meal, which may be in the form of oil-free flakes, with water or with a dilute alkaline solution at a pH substantially different from the isoelectric point of the glycinin. The isoelectric range of the glycinin is in the neighborhood of a pH of 4.2–4.6, and the extraction liquor should have a pH at least as high as 6. A pH above 8 should be avoided in order to avoid discoloration of the soy protein and deterioration of the whipping properties of the modified protein which is later produced.

Although water may be used for the extraction, an alkaline material, such as sodium sulfite, sodium carbonate or sodium hydroxide, is preferably added to the water in a quantity sufficient to bring the pH of the extracting liquor to the desired range. Preferably, this pH is in the neighborhood of 6.4–6.8. Sodium sulfite is particularly suitable for this purpose since it serves not only as an alkaline buffer, but also acts as an antiseptic and produces better quality protein product.

The extraction of the soy bean meal with the dilute alkaline solution may be carried out at a slightly elevated temperature, preferably in the neighborhood of 130° F. The solution is filtered to separate the insoluble materials; diatomaceous earth preferably being used as a filter aid. Instead of filtration, any suitable means of separating the soluble constituents and insoluble constituents, such, for example, as screening or centrifugation, may be used. The soluble constituents consist of the bulk of the protein, the soluble carbohydrates, and the soluble inorganic salts. The insoluble constituents consist of the fiber, any residual oil which is present, a portion of the protein, and a portion of the carbohydrates.

The extraction liquor containing the soluble constituents is subjected to the second step of the process, which consists of the precipitation of the glycinin at the isoelectric pH range thereof. This is accomplished by acidifying the solution to adjust the pH to a range in the neighborhood of 4.2–4.6. Sulfur dioxide, hydrochloric acid, or any suitable acidifying medium may be used for adjusting the pH. When the pH is adjusted to the isoelectric range, the glycinin is precipitated in the form of curd solids. Any soluble constituents, including the soluble inorganic salts and carbohydrates, remain unprecipitated. The precipitate is separated by filtration, centrifugation, or other suitable means, and is then washed with water. This washing step is of considerable importance in that thorough washing removes any residual beany taste in the material and also results in the production of a better whipping agent.

The precipitated glycinin curd is modified by subjecting it to controlled enzymatic modification. Any suitable proteolytic enzyme may be used. Pepsin has been found unusually satisfactory in that a substantially greater proportion of water-soluble protein is obtained in the product through the use of this enzyme. The modification is carried out under conditions of temperature and pH which are favorable to the activity of the enzyme. In the case of pepsin, a pH in the neighborhood of 2 to 3 and a temperature of 100° F.–110° F. is to be preferred. We have found that especially good results are obtained where we use 0.5% pepsin and employ a pH of 2. Adjustment of the pH may be made by the addition of any suitable acidifying agent, such as sulfuric or hydrochloric acids. However, phosphoric acid has been found to be particularly suitable for this purpose.

The enzymatic modification is carried out by treating the glycinin curd in water wherein the solids content of the solution is in the neighborhood of 11% to 13% by weight, within the neighborhood of 0.5% by weight of commercial 1:10,000 potency pepsin at a pH of 2 and a temperature of 100° F.

Modification is continued until the desired percentage of the glycinin is soluble in water at a pH of 5.0. We prefer to continue it until 40% of the glycinin is converted to soluble protein. The product may also contain at least 20% but preferably not more than 35% of the total nitrogen present in the non-protein form. It is important that the modification be limited because if too extensive modification or hydrolysis occurs, the modified protein will not have the desired whipping properties. On the other hand, if the modification is insufficient or too limited, the protein also lacks the desired whipping properties and solubility.

Preferably, the modification is continued until the water solubility of the nitrogenous materials in the product is between 50% and 70% at a pH of 5. It is also preferred that the non-protein nitrogen content of the product be in the range of 25% to 35%. Of course, the extent of modification may be varied according to the type of product which it is desired to obtain. When the modified protein is to be used in the form of a frappé, such as for nougats, the modification may be carried on to a point where in the neighborhood of 60% of the nitrogenous material in the modified product is water-soluble at a pH of 5. This product is substantially miscible in two parts of water and the same time provides a whipping agent which forms a light stable frappé.

In determining the solubility of the product in water, the method outlined by A. K. Smith and S. J. Circle in Industrial and Engineering Chemistry 30, 1414–1418 (1938) for determining water-soluble nitrogen is used. In accordance with this procedure, one gram of the product is dispersed in 50 ml. of water and the pH of the suspension is then adjusted to 5. The suspension is then mechanically shaken for 30 minutes and the volume brought to 100 ml. in a volumetric flask. The suspension is centrifuged for 30 minutes at a temperature of 22° C.–26° C. at 2,000 R. P. M. (centrifuge radius 7.5 inches). The product remaining in the supernatant liquid is considered the water-soluble product while that which is removed in the centrifuging is considered as water-insoluble. The term water-soluble as used herein is intended to refer to a product which remains in the supernatant liquid under these conditions.

The term protein or modified protein as used herein refers to a product which is precipitated by trichloroacetic acid under the following conditions: A one gram sample of the product is weighed into a 200 ml. centrifuge bottle and extracted with 40 ml. of 0.8N. (13.6%) trichloroacetic acid for one-half hour in a mechanical shaker. The suspension is centrifuged for 15 minutes at 2,000 R. P. M. (centrifuge radius 7.5 inches). The supernatant liquid contains the non-protein fraction, while that portion of the product which is separated by the centrifuge is referred to as protein. This method of determination when applied to non-protein nitrogen is described by H. C. Becker, R. T. Milner, and R. H. Nagel, Cereal Chemistry 17, 447–457 (1940).

Water-soluble protein as referred to herein is that which is precipitated and separated by the Becker trichloroacetic acid test, but which remains in the supernatant liquid under the Smith centrifuging test at a pH of 5.0. Water-soluble nitrogen is determined by the Kjeldahl-Gunning-Arnold method on the product remaining in the supernatant liquid after the Smith centrifuge separation. Non-protein nitrogen is determined by the Kjeldahl-Gunning-Arnold method on the supernatant liquid remaining after the Becker trichloroacetic acid test.

When the protein has been modified to the desired extent and it becomes important to halt further enzymatic activity, we adjust the pH to 6.5 with 10% sodium hydroxide. No heat is employed to inhibit enzymatic activity and a complete control is accomplished through the above-mentioned change in pH. The resulting product when formed into a frappé, as described, has an unusually high stability and thus surpasses the product formed by the employment of heat for halting enzymatic modification.

While in the foregoing description, we have set forth certain specific steps and materials as illustrative of one successful process embodying the invention, it will be understood that such steps may be widely modified and equivalent materials employed without departing from the spirit of our invention.

We claim:

1. In a process for preparing modified soy protein, the steps of subjecting glycinin to enzymatic modification with pepsin under conditions of hydrogen ion concentration and temperature which are favorable to the action of the enzyme until at least 60% of the product is soluble in water at a pH of 5.0 and until the non-protein nitrogen content is between 20 and 35%, and then raising the pH to halt further enzymatic modification.

2. In a process for preparing modified soy protein, the steps of subjecting glycinin to enzymatic modification with pepsin under conditions of hydrogen ion concentration and temperature which are favorable to the action of the enzyme until about 70% of the product is soluble in water at a pH of 5.0 and the non-protein nitrogen is less than 35%, and then raising the pH to halt further enzymatic modification.

3. In a process for preparing modified soy protein, the steps of subjecting glycinin to enzymatic modification with pepsin under conditions of hydrogen ion concentration and temperature which are favorable to the action of the enzyme until about 70% of the product is soluble in water at a pH of 5.0 and until the non-protein nitrogen content is between 20 and 35%, and then raising the pH to halt further enzymatic modification.

4. In a process for preparing modified soy protein, the steps of subjecting glycinin to enzymatic modification with pepsin under conditions of hydrogen ion concentration and temperature which are favorable to the action of the enzyme, the percentage of the pepsin being 0.5% based on the glycinin, until at least 60% of the product is soluble in water at a pH of 5.0 and until the non-protein nitrogen content is between 20 and 35%, and then raising the pH to halt further enzymatic modification.

5. A process for the preparation of a soy protein whipping agent, comprising extracting with water soy protein stock containing glycinin, fiber and carbohydrate, separating the glycinin from the fiber and carbohydrate, subjecting the glycinin to enzymatic modification with pepsin under conditions of hydrogen ion concentration and temperature which are favorable to the action of the enzyme until at least 60% of the product is soluble in water at a pH of 5.0 and until between 20 and 35% of the nitrogen of the product is in the form of non-protein nitrogen, and raising the pH to inhibit further enzymatic modification.

LOUIS SAIR.
RICHARD RATHMAN.

REFERENCES CITED

The following references are of record in the file of this patent:

UNITED STATES PATENTS

| Number | Name | Date |
|---|---|---|
| 1,754,825 | Heuser | Apr. 15, 1930 |
| 2,217,264 | Weizmann | Oct. 8, 1940 |
| 2,381,407 | Levinson et al. | Aug. 7, 1945 |